United States Patent Office 3,754,044
Patented Aug. 21, 1973

3,754,044
DEHYDROHALOGENATION OF HALOGENATED COMPOUNDS
Chester Arthur Hargreaves II, and Stanley James Piaseczynski, Wilmington, Del., assignors to E. I. du Pont de Nemours and Company, Wilmington, Del.
No Drawing. Filed Feb. 28, 1968, Ser. No. 712,899
Int. Cl. C07c 21/04, 21/20
U.S. Cl. 260—654 D                                      1 Claim

ABSTRACT OF THE DISCLOSURE

Halogen-containing organic compounds are treated with aqueous inorganic alkaline material in the presence of a catalytic amount of primary catalyst and promoter to split off hydrogen halide.

BACKGROUND OF THE INVENTION

It is known to dehydrohalogenate halogen-containing compounds by reaction with aqueous alkali. Chloroprene (2-chloro-1,3-butadiene) can conventionally be prepared by dehydrochlorinating 3,4-dichloro-1-butene with aqueous alkaline solution such as aqueous sodium hydroxide or potassium hydroxide.

Such a procedure is disclosed in U.S. Pat. 2,430,016. However, these processes are characterized by relatively low reaction rates and there has been a need for a dehydrohalogenation process with a much faster reaction rate than has heretofore been available.

DESCRIPTION OF THE INVENTION

In accordance with this invention there is provided an improvement in the aqeuous process for dehydrohalogenating halogenated aliphatic hydrocarbons containing at least two carbon atoms and at least one hydrogen atoms. The process involves conducting the dehydrohalogenation by reaction with an inorganic alkaline material in aqueous medium in the presence of a catalytic amount of primary catalyst and promoter. Usually the amount of primary catalyst will be about 0.01–10% and the amount of promoter will be about 0.03–1%, by weight based on the weight of the halogenated compound which is being dehydrohalogenated. Mixtures of different catalysts and different promoters can be used. By operating in accordance with the present invention very substantial increases in reaction rate are obtained as well as a reduction in the percentage of the unwanted by-products which are normally produced in aqueous dehydrohalogenation reactions, such as 1-chloro-1,3-butadiene when 3,4-dichloro-1-butene is dehydrohalogenated.

The temperature used in carrying out the process of this invention can vary from about 0° C. to at least about 100° C. At temperatures below about 0° C. the reaction is undesirably slow and temperatures substantially above 100° C. are undesirable because of increased problems of polymerization and by-product formation such as when 3,4-dichloro-butene is being dehydrohalogenated to chloroprene. The most practical temperature range is from about 40° C. to about 85° C. It is most convenient to use the autogenous pressures which develop normally under the reaction conditions. Higher or lower pressures can be used if desired.

The reaction is carried out in the absence of oxygen to avoid subsequent reactions of the dehydrohalogenated product formed. Also, it is highly desirable to add polymerization inhibitors such as phenothiazine, alkyl nitrites, nitroso compounds or other compounds which inhibit polymer formation if the reactants or products are polymerizable.

The alkaline material used in the proces of this invention can be any alkaline material which is capable of effecting a dehydrohalogenation by reaction with a halogenated compound in aqueous media. Alkali metal hydroxides are preferred in the carrying out of the process of this invention. Sodium hydroxide is particularly preferred because of its ready availability. Other hydroxides which can be used include potassium hydroxide, lithium hydroxide, rubidium hydroxide and cesium hydroxide. Alkaline earth metal hydroxides such as calcium and barium hydroxides can also be used.

The hydroxide is preferably used as an aqueous solution and the concentration of hydroxide in the solution can vary over a wide range, for example, from about 2% up to a saturated solution. The primary catalysts and promoters are most effective alkali metal hydroxide concentrations maintained from about 15% up to a saturated solution.

The mole ratio of hydroxide to halo-compound can be as low as about 0.5:1. The optimum mole ratio of reactants to use will vary with the effectiveness of the catalyst employed and the reactivity of the compound being dehydrohalogenated. Higher mole ratios are needed with the less active catalysts and reactants. The upper limit of mole ratio is not critical in general, there is no advantage in using mole ratios above 20:2.

The process may be carried out by either a batch or a continuous process. The product formed may be recovered by conventional techniques. For example, in producing chloroprene the reaction mass may be removed as a liquid, the aqueous and organic phases may be separated by conventional methods, and the chloroprene may be separated from dichlorobutene by distillation. Other methods will be within the scope of one skilled in the art.

Although the invention is illustrated by the dehydrochlorination of chlorine-containing compounds for convenience and because these are the most readily available halogen compounds, it is equally useful for splitting off hydrogen bromide, hydrogen iodide, and hydrogen fluoride from the corresponding bromine-, iodine- and fluorine containing compounds.

The process of this invention is generally applicable to the dehydrohalogenation of halogenated aliphatic hydrocarbons containing at least two carbon atoms and at least one hydrogen atom and is particularly useful for the preparation of chloroprene from 3,4-dichloro-1-butene and preparation of 2,3-dichloro-1,3-butadiene from 2,3,4-trichloro-1-butene or 1,2,3,4-tetrachloro butane. Representative halogenated aliphatic hydrocarbons which can be dehydrohalogenated include chlorocyclohexene, chlorocyclohexane as well as the corresponding polychloro substituted cyclohexanes and cyclohexenes, tetrachlorobutene, ethyl chloride, dichloroethane, trichloroethane, tetrachloroethane and pentachloroethane, 1,4-dichloro-2-butene, 2-chloro-1,3 - butadiene, 1-chloro-1,3-butadiene, propyl chloride, butyl chloride, amyl chloride and the corresponding polychloro analogs of these compounds.

These compounds can be saturated or can contain one or more sites of non-aromatic unsaturation. Preferred are ethylenically unsaturated halogenated hydrocarbons such as 3,4-dichloro-1-butene in which the hydrogen which is to be removed by the dehydrohalogenation reaction is attached to the α-carbon atom relative to the double bond. Normally the latter will involve the splitting off of a single HCl molecule.

More specifically, the present invention is directed to the dehydrohalogenation of a halogenated aliphatic hydrocarbon containing at least two carbon atoms and at least one hydrogen atom by reaction with an inorganic alkaline material in aqueous medium in the presence of about 0.01 to about 10% by weight, based on the weight of said halogenated hydrocarbon, of (1) a primary catalyst composition comprising substantially a quaternary ammonium compound and (2) about 0.03 to about 1% by weight, based on the weight of halogenated hydrocarbon, of a promoter compound.

A phosphate ester comprising substantially a compound whose acid form has the structure $[RO(GO)_n]_m PO(OH)_q$ wherein R is alkyl, aryl, aralkyl, or alkaryl, G is an ethylene or propylene radical, n is 2 to 20 and m is 2 and q is 1, with the proviso that said composition may contain some of said compound in which m is 1 and q is 2.

The phosphate esters utilized in the invention process are known materials prepared by phosphating condensation products of phenols or alcohols with ethylene oxide or propylene oxide. The products commercially available are usually mixtures which can be utilized in practicing the process of this invention. The portion $RO(GO)_nH$ of the above formula is prepared by condensing ethylene oxide or propylene oxide with a compound ROH, in which R is a phenol, an alkyl-substituted phenol, or an aliphatic alcohol. The value n represents the number of moles of alkylene oxide that has been reacted with the compound ROH. In the phosphate esters utilized in the invention process, this number should be at least 2 in order to obtain a material having significant catalytic activity. In general, there is no advantage in condensing more than 20 moles of the alkylene oxide with the hydroxy compound. The alkylene oxide condensation product is then converted to the phosphate ester by known techniques, such as by reaction with $P_2O_5$. The preparation of compounds of this type is described, for example, in U.S. Pat. Nos. 3,004,056 and 3,033,889. U.S. Pat. 3,240,585 discloses additional phosphate esters which can be utilized in practicing this invention process. Specific examples of such esters include, for example, the phosphate ester prepared by reacting 6 mols of ethylene oxide and 1 mol of phenol and then reacting 2.7 mols of the reaction product with 1 mol of phosphorus pentoxide; 2.7 mols of the reaction product of 15 mols ethylene oxide and 1 mol of dinonylphenol reacted with 1 mol phosphorus pentoxide can be utilized, as can, for example, each of the specific phosphate ester reaction products of Examples 1 to 14 set forth in columns 5 and 6 of U.S. Pat. 3,004,056. Mixtures of phosphate esters can also be used.

Suitable compounds for use in preparing the alkylene oxide condensates are phenols and alkyl-substituted phenols, in which the alkyl radicals contain 1 to 20 carbon atoms. Examples include dodecylphenol, cresols, xylenols, dipropylphenol, nonylphenol, octadecylphenol, trimethylphenol, and eicosylphenol. Other suitable compounds include aliphatic alcohols having 1 to 20 carbon atoms such as methanol, isopropyl alcohol, 2-ethylhexanol, dodecanol, hexadecenol, octadecanol, and eicosanol. The alcohols can be branched or unbranched, saturated or unsaturated, as disclosed, for example, in U.S. Pat. 3,033,889. Mixtures of alcohols derived from various fatty acids can be used. Alicyclic alcohols such as cyclohexanol can also be used.

Preferred phosphate ester compositions include those comprising substantially (1) the phosphate ester mixture of mono- and diphosphate esters represented by the following structures:

$$[R-O(CH_2CH_2O)_n]_2 P=O \quad \text{and} \quad [R-O(CH_2CH_2O)_n]P=O$$
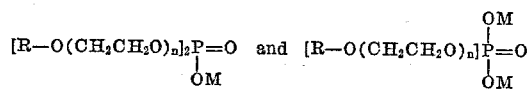

where R=alkyl or alkylphenyl and M is either hydrogen or a cation.

The preceding mixed phosphate ester is available from General Aniline and Film Corporation as "Gafac" PE-510 and has an acid number of from 51 to 57 and a nonionic content from 23 to 40%. The R radical is derived from an alkyl-substituted phenol and n averages about 4; (2) the phosphate ester derived from the condensation product of about six moles of ethylene oxide with phenol, said phosphate ester containing 5.8% phosphorus and having an acid number of from 140 to 160. This phosphate ester is available as a mixture from General Aniline and Film Corporation and is identified as "Antara" LP-700, a mixture of alkylaryl or alkylpolyethyleneoxy phosphate ester acids, and (3) the phosphate ester derived from the condensation product of three moles of ethylene oxide with an aliphatic alcohol; it contains 5.9% phosphorus and has an acid number of 175–195. This phosphate ester mixture is available from the General Aniline and Film Corporation and is identified as "Antara" LS-500, a combination of alkylaryl- or alkylpolyethyleneoxy phosphate ester acids.

For convenience, the quaternary ammonium compounds will hereafter be referred to as the primary catalysts and the phosphate esters above will be referred to as the promoters.

In general, the catalysts increase in effectiveness as the chain length of at least one substituent on the nitrogen increases. Improved effectiveness is also imparted by a hydroxy or ether group in a position beta to the nitrogen atom.

In the quaternary ammonium compounds the anion is not critical. It may be a halogen ion, a hydroxy ion, an ethyl sulfate ion, or any anion which does not interfere with the reaction and which does not proote polymerization of the product. Most often the chloride ion is used because the chlorides are most readily available and least expensive.

The preferred catalysts for use in the present invention are (a) the compounds having the general formula:

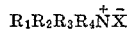

wherein X is a halogen, hydroxy or ethyl sulfate ion and $R_1$, $R_2$ and $R_3$ are aliphatic radicals of up to about 20 carbon atoms and $R_4$ is an aliphatic radical from about 8 to 20 carbon atoms or a benzyl or alkyl-substituted benzyl radical; and (b) compounds having the above structure except that at least one of $R_1$, $R_2$ and $R_3$ contains a hydroxy or ether group in a position beta to the nitrogen atom. Typical of the compounds of type (b) are those having the structure:

$$[H(OCH_2CH_2)_x]\overset{+}{N}R(CH_3)[(CH_2CH_2)_yH]\cdot Cl^-$$

wherein R is an aliphatic hydrocarbon radical of up to about 20 carbon atoms and the sum of $x+y$ ranged from about 2 to 15.

Particularly preferred quaternary ammonium salts are the following:

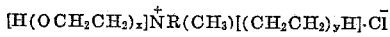

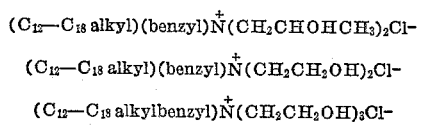

Mixtures of different quaternary ammonium compounds can be used in practicing the present process.

If desired, the quaternary ammonium compound may be formed in situ. For example, amines will react with 1,4-dichloro-2-butene, an impurity usually present in 3,4-dichloro-1-butene, to form mono- and/or di-quaternary ammonium salts.

The following examples are representative and illustrate the invention process. All parts, percentages and proportions are by weight unless otherwise indicated. For example, the weight percentages of catalyst and promoters are based on the weight of dichlorobutene. The weight percentage shown is based on the active ingredient when the material is used in diluted form.

EXAMPLES 1–4

Except in Example 4, the reactor is a flask fitted with an agitator, reflux condenser, and an adaptor fitted with a serum cap for withdrawing samples. Air is flushed from the flask with nitrogen, and an atmosphere of nitrogen is maintained in the reactor. The temperature is controlled by means of a steam bath. The sodium hydroxide is introduced into the flask and brought to reaction temperature (about 60° C.). 3,4-dichloro-1-butene containing about 0.005% phenothiazine and the catalyst composition under investigation is then introduced into the flask through a stoppered glass joint. At the end of the desired reaction time (30 minutes unless otherwise indicated) agitation and temperature control are discontinued. Samples of the organic phase are withdrawn, washed with water, and analyzed by vapor phase chromatography. Area percent analyses are converted to mole percent values from predetermined calibrations. The formula for percent conversion of dichlorobutene is:

Percent conversion
$$= \frac{\text{moles of chloroprene} \times 100}{\text{moles of chloroprene plus moles of unreacted dichlorobutene}}$$

The 3,4-dichloro-1-butene used is 97–98% pure. Molar amounts are not corrected for impurities. The concentration of sodium hydroxide initially charged to the reactor is 20% by weight (based on weight of sodium hydroxide plus weight of water). The mole ratio of sodium hydroxide to dichlorobutene is 1.1:1.

EXAMPLE 1

The catalyst is alkylbenzylbis(2-hydroxypropyl)ammonium chloride in which the alkyl radical is derived from coconut oil (that is, $C_8$ to $C_{18}$ alkyls, predominantly $C_{12}$ to $C_{14}$). The promoter is a mixture of complex mono- and diphosphates having the structure

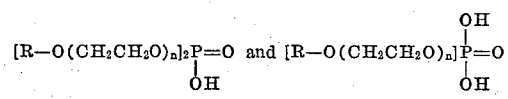

This mixed phosphate ester is available from General Aniline and Film Corporation as "Gafac" PE–510 and has an acid number of from 51 to 57 and a nonionic content from 23 to 40%. Infrared and nuclear resonance spectra indicate that R of said structure is an alkyl substituted phenyl radical and $n$ averages about 4.

Table I shows results of these experiments:

TABLE I

| | Percent | | |
|---|---|---|---|
| | Catalyst | Promoter | Conversion |
| Experiment: | | | |
| 1 | 0.04 | 0 | 67 |
| 2 | 0 | 0.05 | 9.6 |
| 3 | 0.04 | 0.05 | 87.8 |

Experiment 3 above shows the significant effect of the promoter on the activity of the catalyst, even though 0.05% part of the promoter has, by itself, only marginal catalytic effect. The effect of the promoter on power requirements is illustrated in Example 4.

EXAMPLE 2

In this example the catalyst is the same as in Example 1 and the use of two different promoters is shown.

(A) Coco fatty betaine, a carboxyalkyl trialkylammonium inner salt, in which the coco radical is a mixture of $C_8$ to $C_{18}$ alkyl radicals (predominantly $C_{12}$ and $C_{14}$) derived from coconut oil. It is supplied by Textilana Corp. as "Velvetex" BC.

(B) Lauryl ammonium sulfonic acid betaine, a lauryl (sulfoalkyl) dialkylammonium inner salt. This salt is supplied by Textilana Corp. as Sulfobetaine DLH.

Table II shows the results of these experiments:

TABLE II

| Experiment | Catalyst, percent | Promoter compound | Percent | Conversion, percent |
|---|---|---|---|---|
| 1 | 0.08 | 0 | 0 | 89.0 |
| 2 | 0.04 | A | 0.05 | 92.6 |
| 3 | 0.04 | B | 0.05 | 88.5 |
| 4 | 0 | A | 1.0 | 52.3 |
| 5 | 0 | B | 1.0 | 43.0 |

The above Table II shows that the use of the less active and less expensive promoter with the primary catalyst makes it possible to obtain improved or equivalent conversions as compared with those obtained using twice as much primary catalyst and no promoter. Also, significant lowering of power requirements is effected by use of the promoter with the primary catalyst.

EXAMPLE 3

In this example the catalyst is ($C_{12}$–$C_{16}$ alkyl)-benzyldimethylammonium chloride. It is available as "Hyamine" 3500 from Rohm and Haas Co. The promoter is the same as in Example 1.

TABLE III

| | Percent | | |
|---|---|---|---|
| | Catalyst | Promoter | Conversion |
| Experiment: | | | |
| 1 | 0.1 | 0 | 24.5 |
| 2 | 0.05 | 0.1 | 50.2 |

EXAMPLE 4

This example illustrates the lowering of power input requirements by the use of the promoter with the primary catalyst.

The reaction is carried out continuously using a series of four jacketed, fully-baffled, nickel reactors in cascade arrangement. Each reactor is equipped with a variable speed agitator which consists of two four-bladed flat-paddle agitators on a shaft. The reactors are maintained liquid-full under a pressure of 10–20 p.s.i.g. Each reactor is provided with means for withdrawing samples.

The materials used are as follows:
(1) 3,4-dichloro-1-butene (about 98% pure) containing 0.02 percent of phenothiozine and 0.01% butyl nitrite as inhibitors.
(2) 20–22% aqueous sodium hydroxide.
(3) Catalyst and promoter same as in Example 1.

Temperature is maintained at about 60° C. The reactants are continuously metered into the bottom of the first reactor. Samples from each reactor are withdrawn at intervals and treated with 5% hydrochloric acid to neutralize the sodium hydroxide and break the emulsion. The organic phase is separated and analyzed by gas chromatography for percent conversion as in the preceding examples.

In this series of experiments a different agitator speed is used in each run and from agitator speed is calculated the horsepower input per 1000 gallons of reactor volume.

Table VII (page 20) summarizes the results of the experiments and shows results obtained when the promoter is omitted.

While there is some variation between the conditions of the comparison runs 6–10 and the runs 1–5 with respect to concentration of catalyst and mole ratio of sodium hydroxide to dichlorobutene, there is a significant lowering of horsepower requirements. When the promoter is used, for example, the conversion at very low power inputs does not differ greatly from the conversion at the highest power input and that 98% conversion is obtained in the fourth reactor at 3 horsepower per 1000 gallons. In contrast, when no promoter is used, there is considerably lower conversion at the lower power inputs; this would necessitate operation at the higher power inputs to obtain maximum conversion.

TABLE VII

| | Percent | | Mole ratio NaOH DCB | Reaction time, min.[1] | Horsepower per 1,000 gallons | Conversion, percent | | | |
|---|---|---|---|---|---|---|---|---|---|
| | Catalyst | Promoter | | | | Reactor 1 | Reactor 2 | Reactor 3 | Reactor 4 |
| Run: | | | | | | | | | |
| 1 | 0.155 | 0.0470 | 1.14 | 12.52 | 3 | 74.04 | 90.83 | 96.16 | 98.27 |
| 2 | 0.156 | 0.0473 | 1.14 | 12.55 | 17 | 76.99 | 92.29 | 96.83 | 98.67 |
| 3 | 0.153 | 0.0464 | 1.14 | 12.42 | 45 | 77.42 | 93.49 | 96.94 | 98.63 |
| 4 | 0.155 | 0.0471 | 1.14 | 12.52 | 100 | 79.04 | 92.84 | 97.03 | 98.50 |
| 5 | 0.155 | 0.0472 | 1.14 | 12.55 | 200 | 79.14 | 92.88 | 96.71 | 98.24 |
| Comparison | | | | | | | | | |
| 6 | 0.118 | 0 | 1.03 | 13.04 | 3.5 | 31.15 | 60.96 | 75.12 | 78.53 |
| 7 | 0.117 | 0 | 1.03 | 12.79 | 14 | 48.96 | 74.96 | 84.96 | |
| 8 | 0.117 | 0 | 1.03 | 12.70 | 50 | 62.82 | 81.94 | 88.61 | 91.92 |
| 9 | 0.117 | 0 | 1.03 | 12.69 | 95 | 64.18 | 83.76 | 90.56 | 94.56 |
| 10 | 0.117 | 0 | 10.3 | 12.84 | 180 | 68.85 | 85.18 | 91.48 | 94.37 |

[1] Average hold-up time in each vessel.

Similarly, effective results are achieved in the preceding examples on substituting corresponding primary catalysts and promoter compounds as heretofore identified.

The preferred promoter compounds are the phosphate esters of (c) as heretofore described.

The use of the promoters with the primary catalysts, according to the invention process, effects significant results in that: (1) the use of the promoter reduces the amount required of the more expensive primary catalysts. This effect is completely unpredictable since the promoter compounds, in the small amounts being used in the process of this invention, have themselves only a modest catalytic effect.

(2) The use of the promoter significantly lowers the power input required to obtain fast reaction rates. That is, when the promoter is used, very fast reaction rates are obtained at low horsepower input. Without the promoter, it is necessary to operate at much higher horsepower inputs. This effect is clearly illustrated in Example 4. The lowering of power required to obtain maximum reaction rates represents a significant economic advantage.

The amount of the primary catalyst used in practicing the invention depends to a considerable extent on the activity of the particular catalyst and compound being dehydrohalogenated. As little as 0.01% by weight, based on the halogen containing reactant, of the more active catalysts can be used. While up to 10% by weight of the less active catalysts can be used, the promoters of this invention make it possible to use a relatively small amount of the primary catalyst. The preferred range is from about 0.02% to about 5% by weight of the primary catalyst.

The amount of the promoter used ranges from about 0.03% to about 1% by weight, based on the weight of the compound being dehydrohalogenated. The preferred amount varies with the catalytic activity of the primary catalyst, the effectiveness of the promoter and the reactivity of the halogenated compound. In general, the preferred range is from 0.04 to about 0.08%.

By using the primary catalyst and promoter compounds according to the invention process, one obtains increased reaction rates in the conversion of, for example, dichlorobutene to chloroprene and the power input required in the process reactors is significantly lowered.

The embodiments of the invention in which an exclusive property or privilege is claimed are as follows:

1. In a process for dehydrochlorinating a chlorinated aliphatic hydrocarbon selected from the group consisting of 3,4-dichloro-1-butene; 2,3,4-trichloro-1-butene; and 1,2,3,4-tetrachlorobutane, by reacting said chlorinated hydrocarbon with an alkali metal hydroxide in aqueous medium, the improvement of carrying out the reaction at a temperature within the range of about 0° C. to about 100° C. in the presence of both (A) about 0.01 to about 10% by weight, based on the weight of the chlorinated hydrocarbon, of a primary catalyst which is an organic quaternary ammonium compound having the formula $$(C_{12}\text{--}C_{18} \text{ alkyl})(\text{benzyl})\overset{+}{N}(CH_2CHOHCH_3)_2\overset{-}{Cl}$$

and (B) about 0.03 to about 1%, on the same basis, of a promoter composition which is a phosphate ester composition having the structure $[RO(GO)_n]_mPO(OM)_q$ wherein R is an alkyl, aryl, aralkyl or alkaryl radical, G is an ethylene or propylene radical, M is hydrogen or a cation corresponding to the cation of said alkali metal hydroxide, $n$ is 2 to 20, $m$ is 2, and $q$ is 1, with the proviso that said composition may contain some of said compound in which $m$ is 1 and $q$ is 2.

References Cited

UNITED STATES PATENTS

| 2,430,016 | 11/1947 | Hearne et al. | 260—655 |
| 2,879,311 | 3/1959 | Hawkins | 260—654 |
| 2,989,570 | 6/1961 | Conrad et al. | 260—654 |
| 2,999,888 | 9/1961 | Crocker et al. | 260—655 |
| 3,028,439 | 4/1962 | Theiling et al. | 260—654 |
| 3,033,889 | 5/1962 | Chiddix et al. | 260—950 X |
| 3,004,056 | 10/1961 | Nunn et al. | 260—950 X |

FOREIGN PATENTS

| 565,494 | 11/1944 | England | 260—654 D |

HOWARD T. MARS, Primary Examiner

J. A. BOSKA, Assistant Examiner

U.S. Cl. X.R.

260—655